Feb. 26, 1924.
1,484,811
J. O. CORN
BELT TIGHTENER FOR VARIABLE SPEED MECHANISM
Filed June 23, 1922   2 Sheets-Sheet 1
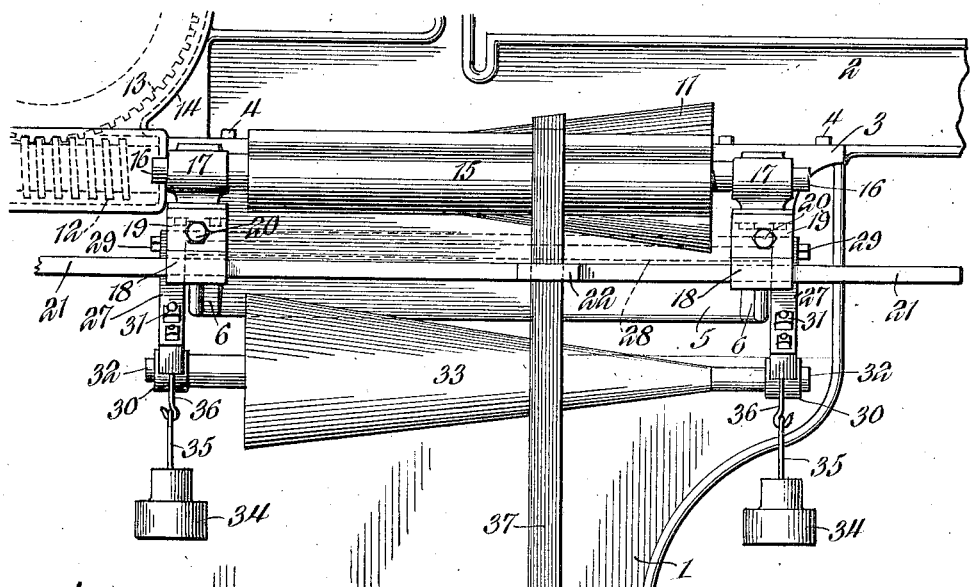
Fig. 1.
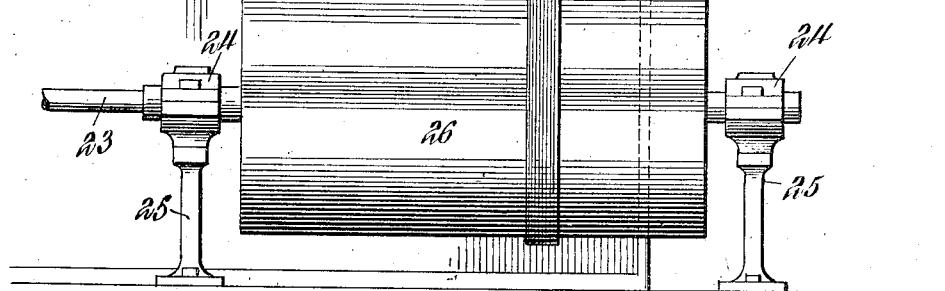
Fig. 2.
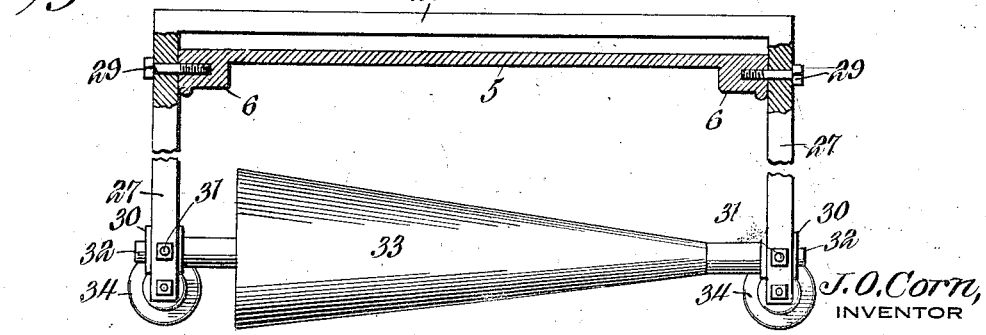
J. O. Corn,
INVENTOR
WITNESSES
BY
ATTORNEY

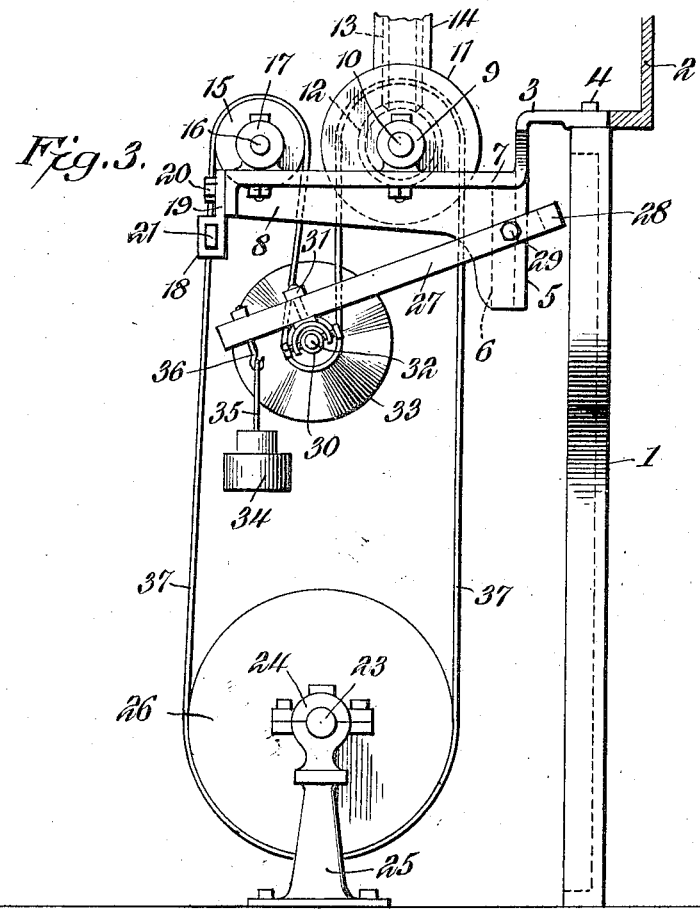
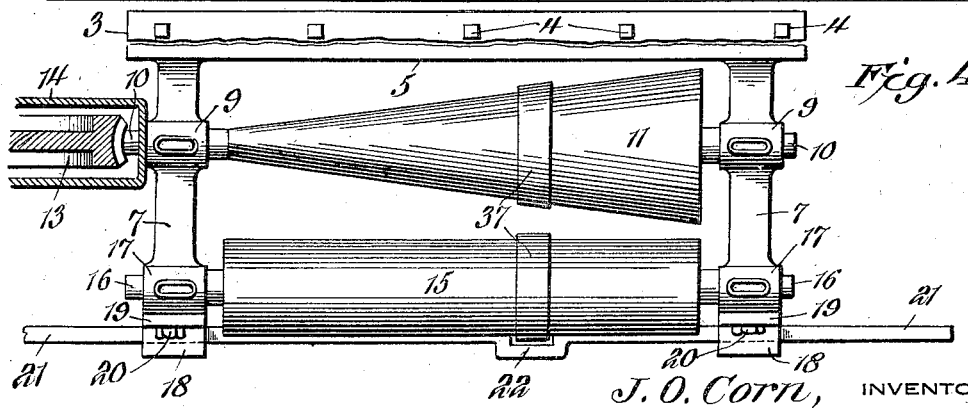

Patented Feb. 26, 1924.

1,484,811

UNITED STATES PATENT OFFICE.

JAMES OSCAR CORN, OF COLUMBIA, SOUTH CAROLINA.

BELT TIGHTENER FOR VARIABLE-SPEED MECHANISM.

Application filed June 23, 1922. Serial No. 570,378.

*To all whom it may concern:*

Be it known that I, JAMES O. CORN, a citizen of the United States, residing at Columbia, in the county of Richland and State of South Carolina, have invented a new and useful Belt Tightener for Variable-Speed Mechanism, of which the following is a specification.

This invention relates to belt tighteners for variable speed mechanisms.

The object is to provide a device of simple construction and capable of being readily applied in position, in the form of an attachment especially designed for use in connection with textile machines, such as that known as the Kitson picker, to maintain an even tension on the drive belt transmitting motion, at variable speed, from the power shaft pulley to the evener motion through the medium of oppositely disposed conical pulleys.

Another object is to provide such an attachment for said machine or other similar machines employing a belt which is shifted longitudinally of the said pulleys by automatic shifting means constituting part of the machine, the said attachment readily permitting of such longitudinal movement of the belt along the pulleys without any interference therewith, and at the same time taking up any slack in the belt caused by atmospheric conditions or from other causes.

A further object is to provide a belt tightening attachment for the speed changing mechanism of textile machines, such as the above named picker or similar machines, which may be applied in position in relation to the said drive belt, by the simple application of two pivotal bolts, and without the necessity for any alterations requiring material change in the machine, certain parts of the said machine being utilized in conjunction with the improved attachment to obtain the desired results.

A full and complete understanding of the invention may be obtained from a consideration of the following detailed description, taken in connection with the accompanying drawings forming part of this specification; it being understood that while the drawings show a practical form of the invention, the latter is not confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:—

Fig. 1 is a front elevation of the improved belt tightener applied to the variable speed mechanism of the Kitson picker.

Fig. 2 is a top plan view, partly broken away, of the device and showing its manner of attachment to the said machine.

Fig. 3 is a side elevation of the subject matter of Fig. 1.

Fig. 4 is a top plan view of the variable speed mechanism of the machine in conjunction with which the improved attachment is used for the purpose of maintaining constant tension on the belt.

In the operation of textile machinery such as picker machines wherein motion is imparted to the evener plates constituting the evener motion through the medium of a belt traversing interposed, oppositely-disposed, tapered pulleys, said belt being longitudinally movable along said pulleys to increase or decrease the speed between the drive pulley on the power shaft and the said evener plates, and said belt being automatically moved by shifting means controlled by the picker mechanism, it is very necessary that the drive belt be made to function instantly in its various automatically adjusted positions on the cones, as the efficiency of the operation of the evener motion depends thereon.

Atmospheric changes materially affect such belts and, through dampness, cause the same to stretch and consequently to slip on the pulleys, thus greatly reducing the efficiency of the machine and resulting in the turning out of inferior work. To overcome this defect, it has heretofore been attempted to compensate for the differences in the belt due to such atmospheric changes, by manually adjusting the idler cone pulley by means of adjustable bearings held in position by bolts or set screws but, in addition to being a slow and laborious operation, the same has proven inefficient as it is almost impossible to aline the bearings with the necessary degree of accuracy, as will be readily understood when it is remembered that the pulleys are oppositely tapered.

The invention contemplates the mounting of the idler cone pulley in a swinging frame, so that the same may freely move upwardly or downwardly as necessary to compensate for any shrinking or stretching of the drive belt, the weight of said idler and frame, together with additional weights, being employed to maintain the belt in taut condition, no matter what position the latter may have been shifted to along the pulleys by the automatic shifter, thus providing for a regular and even transmission of power to the evener motion and always insuring an instant response when the shifter is automatically actuated.

While the invention may be applied to various kinds of machines, as has been stated, for the purposes of illustration it has been deemed sufficient to show the same applied to a Kitson picker and only such portion of the same as is necessary for the purpose.

Referring to Figs. 1 and 3, more particularly, there is shown a portion 1 of the leg or standard of the above-mentioned machine, the said portion being the right hand end of the same. Mounted above the machine and extending to the right is a frame 2, within which certain portions of the machine are located. Mounted on the top edge of the leg or standard 1 is an outstanding bracket 3, having an attaching plate through which fastening bolts 4 are passed and threaded into the standard to rigidly secure the same in position, the bracket 3 includes an integrally formed, downwardly extending plate 5, extending longitudinally of the machine and spaced from the front face of the leg or standard 1 and parallel to the same, said plate being enlarged at each vertical end edge, to provide strengthening ribs 6, as clearly shown in Fig. 2. The bracket also includes a pair of spaced, forwardly-extending arms 7 located at the ends thereof, and provides beneath the same strengthening webs 8, said arms 7 supporting at intermediate points alined bearings 9, in which the end trunnions 10 of an upper, conical pulley 11 are mounted. This pulley, as shown, has its larger end located at the right hand end of the bracket, and the peripheral edge of the same is in spaced relation to the front face of the depending plate 5. The left hand end of the pulley 11 is joined, through the adjacent trunnion 10 to a worm 12, having connection with the worm wheel 13 located within a casing 14, and having suitable connection with means (not shown) for transmitting motion to the evener mechanism forming a part of the aforesaid machine.

In advance of the tapered pulley 11 and in longitudinal alinement with the axis of the same, is another pulley 15 having trunnions 16 mounted in bearings 17 carried by the arms 7 near the outer free ends of the same, said pulley extending the full length of the tapered pulley and having straight, parallel sides and constituting an idler pulley.

Rectangular guides 18 having upwardly extending attaching plates 19 are suitably bolted, as at 20, to the front ends of the arms 7, and are adapted to receive the horizontally sliding bar 21 of the automatic belt shifter of the said machine, said bar being located below the front idler pulley 15 and having an intermediate belt-receiving offset 22 located between the guides 18.

A drive shaft 23 arranged longitudinally of the machine and in front of the standard 1, is mounted in spaced relation to the floor in bearings 24 carried at the upper ends of legs or pedestals 25. These bearings are substantially in vertical alinement with the upper bearings carried by the arms 7, as viewed from the front and shown in Fig. 1 of the drawings and, as viewed from the side as in Fig. 3, the lower bearings are substantially below a central point between the spaced bearings 9 and 17, respectively, and are sufficiently elevated above the floor by the pedestals 25 to provide ample space for the drive pulley 26 mounted on and keyed to the shaft 23 and having straight, parallel sides as shown in Fig. 1.

As thus far described, the arrangement of the parts is substantially the same as in the Kitson machine, and the description of and the manner of attaching the improved tightener will now be proceeded with.

A swinging frame formed of suitable metal either cast or welted or otherwise formed into shape, consists of spaced, parallel side arms 27, joined at one end by a connecting arm or body member 28 formed integrally therewith (Fig. 2) and adapted to be located longitudinally of the machine, and between the front face of the leg or standard 1 of the machine and the rear face of the depending plate 5 of the bracket 3, with the side arms 27 lying adjacent to the outer faces of the end ribs or enlargements 6 formed at each end of the plate 5, as before stated. The arms 27 are pivoted by bolts 29 traversing suitable alined openings in the same adjacent to the points of junction with the rear connecting bar 28, said bolts having threaded connection with the ribs or enlargements 6, as shown in Fig. 2, so that the said frame may freely swing about the horizontal axis provided by the bolts 29.

Attached to the under sides of the arms 27, and near the front ends of the same are alined bearings 30 adjustable, by means of nuts 31, towards or from the lower side of said arms, and end trunnions 32 of a tapered pulley 33 are carried by the said bearings which are so located on the arms as to position the axis of the pulley 33 substantially below the midway point between the bearings 9 and 17. At their outer free ends, the arms 27 carry weights 34 which, together with the weight of the pulley 33 and the arms 27, serve to cause a downwardly-swinging movement of the frame at all times. The weights 34 may be hung by a bolt 35 provided with a suitable eye for connection with a hook 36, or the same may be attached to the arms 27 in any other manner.

The pulley 11 has its large end arranged to the right, as viewed in Fig. 1, while the pulley 33 is oppositely arranged with its small end to the right, and constitutes a tightener pulley for the endless belt 37, which is passed around the lower drive pulley 26, as shown in Fig. 3, with its front flight extending through the offset 22 of the automatic shifter bar 21, and passing over the straight faced front idler 15 downwardly and around the tensioning pulley 33, thence upwardly and around the reversely tapered pulley 11, and the rear flight of the belt then passes downwardly in back of and around the drive pulley 26.

No matter what position the belt may occupy on the several pulleys, due to the adjustment of the automatic shifter, and no matter how much stretching or contraction the belt may be subjected to due to atmospheric or other causes, the pulley 33 will compensate for the same as will be readily understood.

The pulley 33, as ordinarily installed in the Kitson machine, is fixed in position to the undersides of the arms 7 and provides no automatic tensioning of the belt, it being necessary to adjust the bearings for the same by means of adjusting screws which are very difficult to set in true alinement every time it is necessary to effect a tightening or a loosening of the belt. In applying my improvement, this same pulley may be removed from the Kitson machine, together with the bearings for the same and readily applied in position on the swinging frame, thus effecting a material saving in the cost of installation.

From the foregoing, it will be seen that a simple and effective tensioning device has been provided which may be manufactured at a very low cost and installed in a Kitson picker, or other machine of similar character, without the necessity for any material alteration in the same, and that the device will at all times take care of any change in the belt caused by changes in the atmosphere, or from other causes.

What is claimed is:—

1. In variable speed mechanism, the combination with a pair of spaced horizontal pulleys having parallel axes on the same horizontal plane, one of said pulleys constituting an idler, the other pulley being cone-shaped and having connections for imparting motion, a drive pulley located below the pair of pulleys, a belt automatically shiftable longitudinally of the pulleys and passing beneath the drive pulley and upwardly on the outside of and over the said pair of pulleys, of a gravity-actuated, cone-shaped pulley, reversely arranged to the first-named conical pulley and located beneath the space between the pair of pulleys and engaging a downwardly extended loop portion of the belt to automatically take up slack in the belt.

2. In variable speed mechanism, the combination with a pair of spaced horizontal pulleys having parallel axes on the same horizontal plane, one of said pulleys constituting an idler, the other pulley being cone-shaped and having connections for imparting motion, a drive pulley located below the pair of pulleys, a belt automatically shiftable longitudinally of the pulleys and passing beneath the drive pulley and upwardly on the outside of and over the said pair of pulleys, of a gravity-actuated, cone-shaped pulley, reversely arranged to the first-named conical pulley, and located beneath the space between the pair of pulleys and engaging a downwardly extended loop portion of the belt to act as an automatic tightener for the belt, and a pivotally mounted frame on which said tightening pulley is mounted.

3. A belt tightener for variable speed mechanism, said mechanism including upper elongated pulleys mounted in spaced and parallel relation to each other, one of said pulleys constituting an idler, the other pulley being cone-shaped and connected to transmit motion, a drive pulley arranged below said pulleys, an endless belt traversing the three pulleys and having a depending loop between the upper pulleys, said tightener comprising a frame pivotally mounted for up-and-down movement, and a cone pulley mounted on the frame and engaging the said loop in the belt, the taper of the cone being oppositely disposed to the taper of the upper cone-shaped pulley.

4. A belt tightener for variable speed mechanism, said mechanism including upper elongated pulleys mounted in spaced and parallel relation to each other, one of said pulleys having parallel sides constituting an idler, the other pulley being cone-shaped and connected to transmit motion, an elongated drive pulley arranged below said pulleys, an endless belt traversing the three pulleys and having a depending loop between the upper pulleys, an automatic belt shifter engaging the belt adjacent to the straight-sided idler, said tightener comprising a U-shaped frame pivoted near its closed side to a support adjacent to the upper conical pulley, a cone-shaped pulley mounted in the open side of the frame and traversing the loop in the belt and being oppositely disposed to the upper cone pulley, and weights carried by the frame to cause the swinging frame pulley to compensate for any variations in the length of the belt.

In testimony, that I claim the foregoing as my own, I have hereto affixed my signature.

JAMES OSCAR CORN.